United States Patent
Boualleg et al.

(10) Patent No.: US 11,370,976 B2
(45) Date of Patent: Jun. 28, 2022

(54) METHOD FOR HYDROGENATING AROMATICS USING A CATALYST OBTAINED BY IMPREGNATION COMPRISING A SPECIFIC SUPPORT

(71) Applicant: IFP Energies Nouvelles, Rueil-Malmaison (FR)

(72) Inventors: Malika Boualleg, Villeurbanne (FR); Anne-Claire Dubreuil, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 190 days.

(21) Appl. No.: 16/630,042

(22) PCT Filed: Jun. 13, 2018

(86) PCT No.: PCT/EP2018/065729
§ 371 (c)(1),
(2) Date: Jan. 10, 2020

(87) PCT Pub. No.: WO2019/011569
PCT Pub. Date: Jan. 17, 2019

(65) Prior Publication Data
US 2021/0087476 A1    Mar. 25, 2021

(30) Foreign Application Priority Data
Jul. 13, 2017 (FR) ...................... 1756655

(51) Int. Cl.
| | | |
|---|---|---|
| *C10G 45/48* | (2006.01) | |
| *B01J 21/04* | (2006.01) | |
| *B01J 23/755* | (2006.01) | |
| *B01J 35/00* | (2006.01) | |
| *B01J 35/02* | (2006.01) | |
| *B01J 35/10* | (2006.01) | |
| *B01J 37/02* | (2006.01) | |
| *B01J 37/03* | (2006.01) | |

(52) U.S. Cl.
CPC .............. *C10G 45/48* (2013.01); *B01J 21/04* (2013.01); *B01J 23/755* (2013.01); *B01J 35/006* (2013.01); *B01J 35/0013* (2013.01); *B01J 35/023* (2013.01); *B01J 35/1014* (2013.01); *B01J 35/1042* (2013.01); *B01J 35/1061* (2013.01); *B01J 37/0207* (2013.01); *B01J 37/031* (2013.01); *C10G 2300/1096* (2013.01)

(58) Field of Classification Search
CPC ...... B01J 21/04; B01J 23/755; B01J 35/0013; B01J 35/006; B01J 35/023; B01J 35/1014; B01J 35/1042; B01J 35/1061; B01J 35/109; B01J 35/1095; B01J 37/0207; B01J 37/031; C10G 45/48; C10G 2300/1096; C01P 2004/90; C01P 2004/51; C01P 2004/64
USPC ................ 502/337; 585/269, 270, 275–277; 423/626, 628
See application file for complete search history.

(56) References Cited

U.S. PATENT DOCUMENTS

| | | | | | |
|---|---|---|---|---|---|
| 2,838,375 | A | * | 6/1958 | Gring ....................... | B01J 23/42 423/628 |
| 4,179,411 | A | * | 12/1979 | Broersma ................ | B01J 20/08 502/322 |
| 4,361,705 | A | * | 11/1982 | Marcelin .................. | B01J 27/16 568/462 |
| 5,777,186 | A | * | 7/1998 | Shimizu .................. | C10G 45/44 585/269 |
| 10,258,969 | B2 | * | 4/2019 | Boualleg .................. | B01J 37/08 |
| 10,307,738 | B2 | * | 6/2019 | Boualleg ............. | B01J 35/1042 |
| 10,350,580 | B2 | * | 7/2019 | Boualleg ............. | B01J 35/1047 |
| 10,392,570 | B2 | | 8/2019 | Boualleg et al. | |
| 2014/0367311 | A1 | * | 12/2014 | Yu .......................... | C10G 45/12 208/213 |
| 2017/0137724 | A1 | | 5/2017 | Boualleg et al. | |
| 2018/0362861 | A1 | | 12/2018 | Boualleg et al. | |

FOREIGN PATENT DOCUMENTS

| | | |
|---|---|---|
| FR | 3022254 A1 | 12/2015 |
| FR | 3022255 A1 | 12/2015 |
| FR | 3044677 A1 | 6/2017 |

OTHER PUBLICATIONS

International Search Report dated Jul. 27, 2018 issued in corresponding PCT/EP2018/065729 application (3 pages).

* cited by examiner

*Primary Examiner* — Patricia L. Hailey
(74) *Attorney, Agent, or Firm* — Millen, White, Zelano and Branigan, P.C.; Harry B. Shubin

(57) ABSTRACT

Process for hydrogenating at least one aromatic or polyaromatic compound contained in a hydrocarbon feedstock having a final boiling point of less than or equal to 650° C., said process being performed in the gas phase or in the liquid phase at a temperature of between 30 and 350° C., at a pressure of between 0.1 and 20 MPa, at a hydrogen/(aromatic compounds to be hydrogenated) mole ratio of between 0.1 and 10 and at an hourly space velocity (HSV) of between 0.05 and 50 $h^{-1}$, in the presence of a catalyst comprising an active phase comprising nickel, said active phase not comprising any group VIB metal, and a support comprising an amorphous mesoporous alumina having a connectivity (Z) of greater than 2.7, the connectivity being determined from the nitrogen adsorption/desorption isotherms.

14 Claims, No Drawings

METHOD FOR HYDROGENATING AROMATICS USING A CATALYST OBTAINED BY IMPREGNATION COMPRISING A SPECIFIC SUPPORT

TECHNICAL FIELD

The invention relates to a process for hydrogenating at least one aromatic or polyaromatic compound contained in a hydrocarbon-based feedstock allowing the transformation of the aromatic compounds of petroleum or petrochemical fractions by conversion of the aromatic nuclei into naphthenic nuclei, in the presence of a nickel-based catalyst supported on an alumina support having highly connected porosity, i.e. having a very high number of adjacent pores.

PRIOR ART

Catalysts for the hydrogenation of aromatic compounds are generally based on metals from group VIII of the Periodic Table of the Elements, such as nickel. The metal is in the form of nanometric metal particles deposited on a support which may be a refractory oxide. The content of group VIII metal, the possible presence of a second metal element, the size of the metal particles and the distribution of the active phase in the support, and also the nature and pore distribution of the support are important parameters as regards the performance of catalysts.

The rate of the hydrogenation reaction is governed by several criteria, such as the diffusion of the reagents to the surface of the catalyst (external diffusional limitations), the diffusion of the reagents in the porosity of the support toward the active sites (internal diffusional limitations) and the intrinsic properties of the active phase such as the size of the metal particles and the distribution of the active phase in the support.

As regards the size of the metal particles, it is generally accepted that the catalyst is proportionately more active the smaller the size of the metal particles. Furthermore, it is important to obtain a particle size distribution centered on the optimum value and also a narrow distribution around this value.

As regards the internal diffusional limitations, it is important for the pore distribution of the macropores and mesopores to be suited to the desired reaction in order to ensure diffusion of the reagents in the porosity of the support toward the active sites and also the diffusion of the products formed toward the exterior.

Numerous developments thus relate to the optimization of the pore distribution of the catalyst by optimizing the support for the catalyst.

WO 2011/080515 describes a nickel-based hydrogenation catalyst supported on alumina, which has a nickel content of greater than 35% by weight, said catalyst having a large dispersion of nickel (0) on the surface of an alumina of very open porosity and with a high specific surface area. The pore distribution of the support is bimodal: at least 30% of the total pore volume (also referred to as TPV in the description) consists of pores with a diameter of between 5 and 20 nm, and at least 20% of the total pore volume consists of pores with a diameter of between 100 and 700 nm with a total pore volume of the support of at least 1.0 mL/g. The nickel surface area must be greater than or equal to 110 $m^2$ per gram of nickel.

U.S. Pat. No. 6,673,743 describes an alumina-based catalyst with a nickel content of between 5% and 75% by weight relative to the total weight of the catalyst with a nickel surface area of greater than 80 $m^2$ per gram of nickel and a median diameter of greater than 10 nm, said catalyst being in the form of particles with a diameter of between 1 and 20 μm, i.e. in powder form.

U.S. Pat. No. 5,478,791 describes an alumina-based catalyst with a nickel content of between 10% and 60% by weight relative to the total weight of the catalyst, the nickel particles having a diameter of between 15 and 50 nm. The total volume of the catalyst is between 0.3 and 0.75 g/L and between 15% and 75% of the total pore volume is in pores with a diameter of greater than 100 nm. The catalyst also has micropores.

Finally, U.S. Pat. No. 4,920,089 describes an alumina-based catalyst with a nickel content of between 5% and 40% by weight relative to the total weight of the catalyst, with a nickel surface area of between 80 and 300 $m^2$ per gram of nickel. The alumina has a particular XRD diffractogram. The pore distribution of the catalyst is between 3.5 and 30 nm and preferably between 4 and 20 nm.

In this context, one of the objects of the present invention is to propose a process for the hydrogenation of aromatic or polyaromatic compounds in the presence of a catalyst comprising an active phase of nickel deposited on a support that is optimized in terms of pore distribution, allowing hydrogenation performance in terms of activity to be obtained that is at least as good as, if not better than, the known processes of the prior art.

The Applicant has discovered that a catalyst prepared by impregnation of an active phase of nickel on an alumina resulting from the calcination of a particular alumina gel prepared according to the preparation process described below makes it possible to obtain a catalyst which has a pore distribution that is particularly suited to hydrogenation reactions of aromatic or polyaromatic compounds contained in a hydrocarbon-based feedstock.

Specifically, the particular textural properties of the alumina support for the catalyst used in the context of the process according to the invention, namely a support having a highly connected porosity, i.e. having a very high number of adjacent pores, represent an important advantage for the diffusion of the molecules of the feedstock to be treated during the implementation of the selective hydrogenation process. Moreover, the particular connectivity and reactivity of the support used in the catalyst, due to the particular dispersibility of the alumina gel used for the preparation of the support, allows a better distribution of the active phase within the support, and thus makes it possible to obtain a catalyst with increased performance in terms of activity.

One of the advantages of the present invention lies in the use, in a process for hydrogenating aromatic or polyaromatic compounds, of a catalyst comprising an alumina prepared according to a quite specific process, from a highly dispersible alumina gel, which is itself obtained according to a quite specific preparation process allowing the forming of said gel. The alumina gel, from which originates the alumina used as support for the catalyst, is prepared using a precipitation step in which at least 40% by weight of alumina relative to the total amount of alumina formed on conclusion of said gel preparation process, are formed as early as the first precipitation step. This preparation process is performed by means of implementing a hydrothermal treatment step and in particular a maturation step allowing the production of a support which has improved filterability, and facilitating its forming.

SUBJECTS OF THE INVENTION

A first subject according to the invention relates to a process for hydrogenating at least one aromatic or polyaromatic compound contained in a hydrocarbon feedstock having a final boiling point of less than or equal to 650° C., said process being performed in the gas phase or in the liquid phase, at a temperature of between 30 and 350° C., at a pressure of between 0.1 and 20 MPa, at a hydrogen/(aromatic compounds to be hydrogenated) mole ratio of between 0.1 and 10 and at an hourly space velocity HSV of between 0.05 and 50 $h^{-1}$, in the presence of a catalyst comprising an active phase comprising nickel, said active phase not comprising any group VIB metal, and a support comprising an amorphous mesoporous alumina having a connectivity (Z) of greater than 2.7, the connectivity being determined from the nitrogen absorption/-desorption isotherms.

Preferably, the nickel content of said catalyst is between 5% and 65% by weight relative to the total weight of the catalyst.

Advantageously, said alumina support has a connectivity (Z) of between 2.7 and 10.

Preferably, the support has a mesopore volume of greater than or equal to 0.40 mL/g.

Advantageously, the support has mesopores with a mesopore median diameter of between 8 and 25 nm.

Particularly preferably, the support has the following pore distribution:
  the volume percentage included in the pores between 2 and 6 nm in size is between 1% and 25% of the total pore volume;
  the volume percentage included in the pores greater than 6 nm and less than 15 nm in size represents between 40% and 95% of the total pore volume;
  the volume percentage included in the pores between 15 and 50 nm in size represents 0 to 50% of the total pore volume; and
  the volume percentage included in the pores between 50 and 7000 nm in size, which corresponds to the macropore volume, represents 0 to 20% of the total pore volume.

Advantageously, the support does not have any micropores.

Preferably, the nickel particle size in the catalyst is less than 20 nm.

The catalyst used in the context of the hydrogenation process according to the invention is prepared via at least the following steps:
  a) at least one step of precipitation of alumina, in aqueous reaction medium, of at least one basic precursor chosen from sodium aluminate, potassium aluminate, ammonia, sodium hydroxide and potassium hydroxide and of at least one acidic precursor chosen from aluminum sulfate, aluminum chloride, aluminum nitrate, sulfuric acid, hydrochloric acid and nitric acid, in which at least one of the basic or acidic precursors comprises aluminum, the relative flow rate of the acidic and basic precursors is chosen so as to obtain a pH of the reaction medium of between 8.5 and 10.5 and the flow rate of the acidic and basic precursor(s) containing aluminum is adjusted so as to obtain a rate of progress of said first step of between 40% and 100%, the rate of progress being defined as being the proportion of alumina formed as $Al_2O_3$ equivalent during said first precipitation step relative to the total amount of alumina formed on conclusion of step c) of the preparation process, said first precipitation step taking place at a temperature of between 10 and 50° C., and for a time of between 2 minutes and 30 minutes,
  b) a step of heat treatment of the suspension heated to a temperature of between 50 and 200° C. for a time of between 30 minutes and 5 hours allowing the production of an alumina gel,
  c) a step of filtering the suspension obtained on conclusion of the heat treatment step b), followed by at least one step of washing the gel obtained,
  d) a step of drying the alumina gel obtained on conclusion of step c) to obtain a powder,
  e) a step of forming the powder obtained on conclusion of step d) to obtain the crude material,
  f) a step of heat treatment of the crude material obtained on conclusion of step e) at a temperature of between 500 and 1000° C., in the presence or absence of an air stream containing up to 60% by volume of water, to obtain a calcined aluminous porous oxide support,
  g) a step of impregnating said support with a solution comprising the salt(s) of the precursor(s) of the nickel-based active phase,
  h) a step of drying the impregnated support at a temperature below 250° C., so as to obtain a dried catalyst.

In an embodiment according to the invention in which, in the case where the degree of progress obtained on conclusion of the first precipitation step a) is less than 100%, said preparation process comprises a second precipitation step a') after the first precipitation step a).

Preferably, the sulfur content of the alumina gel obtained on conclusion of step b) is between 0.001% and 2% by weight relative to the total weight of the alumina gel, and the sodium content of said alumina gel is between 0.001% and 2% by weight relative to the total weight of said alumina gel.

Advantageously, at least one step i) of heat treatment of the dried catalyst obtained on conclusion of step h) is performed at a temperature of between 250 and 1000° C., in the presence or absence of water.

Advantageously, at least one step of reductive treatment j) in the presence of a reducing gas is performed after steps h) or i) so as to obtain a catalyst comprising nickel at least partially in metallic form.

According to a preferred embodiment of the hydrogenation process according to the invention, hydrogenation of benzene is performed at a temperature of between 30 and 250° C., at a pressure of between 0.1 and 10 MPa, at a hydrogen/(benzene) mole ratio of between 0.1 and 10 and at an hourly space velocity HSV of between 0.05 and 50 $h^{-1}$.

According to a preferred embodiment of the hydrogenation process according to the invention, said hydrocarbon feedstock is a reformate obtained from catalytic reforming.

DETAILED DESCRIPTION OF THE INVENTION

1. Definitions

Throughout the rest of the text, the connectivity of the alumina of the catalyst used in the process according to the invention is representative of the total amount of the porosity of the alumina and in particular of the total amount of the mesoporosity of the alumina, i.e. the total amount of pores with a mean diameter of between 2 and 50 nm.

The connectivity is a relative magnitude measured according to the procedure described in the publication by Seaton (Liu H., Zhang L., Seaton N. A., Chemical Engineering Science, 47, 17-18, pages 4393-4404, 1992). It is a Monte-Carlo simulation using the nitrogen absorption/desorption isotherms. These connectivity parameters are based on the percolation theory. The connectivity is connected to the numbers of adjacent pores and represents an advantage for diffusion during the catalytic reactions of the molecules to be treated.

Throughout the rest of the text, the dispersibility index is defined as the weight of peptized alumina gel that can be dispersed by centrifugation in a polypropylene tube at 3600×G for 10 minutes. The dispersibility is measured by dispersing 10% of boehmite or alumina gel in a suspension of water also containing 10% nitric acid relative to the mass of boehmite. Next, the suspension is centrifuged at 3600×G for 10 minutes. The sediments collected are dried at 100° C. for 16 hours and then weighed. The degree of dispersibility, denoted DI, is obtained by the following calculation: DI (%)=100%−mass of dried sediments (%).

The term "macropores" means pores with an aperture of greater than 50 nm.

The term "mesopores" means pores with an aperture of between 2 nm and 50 nm, limits included.

The term "micropores" means pores with an aperture of less than 2 nm.

The term "total pore volume" of the catalyst or of the support used for the preparation of the catalyst according to the invention means the volume measured by mercury intrusion porosimetry according to the standard ASTM D4284-83 at a maximum pressure of 4000 bar (400 MPa), using a surface tension of 484 dynes/cm and a contact angle of 140°. The wetting angle was equal to 140° following the recommendations in the publication "Techniques de l'ingénieur, traité analyse et caractérisation [Engineering techniques, treatise on analysis and characterization]", pages 1050-1055, written by Jean Charpin and Bernard Rasneur.

In order to obtain better precision, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (about 0.2 MPa).

The volume of the macropores and mesopores is measured by mercury intrusion porosimetry according to the standard ASTM D4284-83 at a maximum pressure of 4000 bar (400 MPa), using a surface tension of 484 dynes/cm and a contact angle of 140°. The value at and above which mercury fills all the intergranular voids is set at 0.2 MPa, and it is considered that, beyond this value, mercury penetrates into the pores of the sample.

The macropore volume of the catalyst or of the support used for the preparation of the catalyst according to the invention is defined as being the cumulative volume of mercury introduced at a pressure of between 0.2 MPa and 30 MPa, corresponding to the volume contained in the pores with an apparent diameter of greater than 50 nm.

The mesopore volume of the catalyst or of the support used for the preparation of the catalyst according to the invention is defined as being the cumulative volume of mercury introduced at a pressure of between 30 MPa and 400 MPa, corresponding to the volume contained in the pores with an apparent diameter of between 2 and 50 nm.

The micropore volume is measured by nitrogen porosimetry. Quantitative analysis of the microporosity is performed using the "t" method (Lippens-De Boer method, 1965) which corresponds to a transform of the starting adsorption isotherm as described in the publication "Adsorption by powders and porous solids. Principles, methodology and applications" written by F. Rouquérol, J. Rouquérol and K. Sing, Academic Press, 1999.

The median mesopore diameter is also defined as being the diameter such that all the pores, among all of the pores constituting the mesopore volume, having a size less than this diameter constitute 50% of the total mesopore volume determined by mercury intrusion porosimetry.

The median macropore diameter is also defined as being the diameter such that all the pores, among all of the pores constituting the macropore volume, with a size less than this diameter constitute 50% of the total macropore volume determined by mercury intrusion porosimetry.

The term "specific surface area" of the catalyst or of the support used for the preparation of the catalyst according to the invention means the BET specific surface area determined by nitrogen adsorption in accordance with the standard ASTM D3663-78 established from the Brunauer-Emmett-Teller method described in the publication "The Journal of American Society", 60, 309 (1938).

In the text hereinbelow, the groups of chemical elements are given according to the CAS classification (CRC Handbook of Chemistry and Physics, published by CRC Press, Editor-in-Chief D. R. Lide, 81st edition, 2000-2001). For example, group VIII according to the CAS classification corresponds to the metals in columns 8, 9 and 10 according to the new IUPAC classification.

2. Description

Process for Hydrogenating Aromatics

A subject of the present invention is a process for hydrogenating at least one aromatic or polyaromatic compound contained in a hydrocarbon feedstock with a final boiling point of less than or equal to 650° C., generally between 20 and 650° C. and preferably between 20 and 450° C. Said hydrocarbon feedstock containing at least one aromatic or polyaromatic compound may be chosen from the following petroleum or petrochemical fractions: catalytic reforming reformate, kerosene, light gas oil, heavy gas oil, cracking distillates, such as FCC recycling oil, coking unit gas oil, hydrocracking distillates.

The content of aromatic or polyaromatic compounds contained in the hydrocarbon feedstock treated in the hydrogenation process according to the invention is generally between 0.1% and 80% by weight, preferably between 1% and 50% by weight and particularly preferably between 2% and 35% by weight, the percentage being based on the total weight of the hydrocarbon feedstock. The aromatic compounds present in said hydrocarbon feedstock are, for example, benzene or alkylaromatics such as toluene, ethylbenzene, o-xylene, m-xylene or p-xylene, or else aromatics containing several aromatic nuclei (polyaromatics) such as naphthalene.

The sulfur or chlorine content of the feedstock is generally less than 5000 ppm by weight of sulfur or chlorine, preferably less than 100 ppm by weight and particularly preferably less than 10 ppm by weight.

The technological implementation of the process for hydrogenating aromatic or polyaromatic compounds is performed, for example, by injection, as an ascending or descending stream, of the hydrocarbon feedstock and of hydrogen into at least one fixed-bed reactor. Said reactor may be of isothermal type or of adiabatic type. An adiabatic reactor is preferred. The hydrocarbon feedstock may advantageously be diluted by one or more reinjections of the effluent obtained from said reactor in which the hydrogenation reaction of the aromatics takes place, at various points in the reactor, located between the inlet and the outlet of the reactor so as to limit the temperature gradient in the reactor. The technological implementation of the process for hydrogenating aromatics according to the invention may also be advantageously performed by implanting at least said supported catalyst in a reactive distillation column or in reactor-exchangers or in a slurry-type reactor. The hydrogen stream may be introduced at the same time as the feedstock to be hydrogenated and/or into one or more different points of the reactor.

The hydrogenation of the aromatic or polyaromatic compounds may be performed in the gas phase or in the liquid phase, preferably in the liquid phase. In general, the hydrogenation of the aromatic or polyaromatic compounds takes place at a temperature of between 30 and 350° C., preferably between 50 and 325° C., at a pressure of between 0.1 and 20 MPa, preferably between 0.5 and 10 MPa, at a hydrogen/(aromatic compounds to be hydrogenated) mole ratio of between 0.1 and 10 and at an hourly space velocity HSV of between 0.05 and 50 $h^{-1}$, preferably between 0.1 and 10 $h^{-1}$, of a hydrocarbon feedstock containing aromatic or polyaromatic compounds and having a final boiling point of less than or equal to 650° C., generally between 20 and 650° C. and preferably between 20 and 450° C.

The hydrogen flow rate is adjusted so as to have a sufficient amount thereof to theoretically hydrogenate all of the aromatic compounds and to maintain an excess of hydrogen at the reactor outlet.

The conversion of the aromatic or polyaromatic compounds is generally greater than 20 mol %, preferably greater than 40 mol %, more preferably greater than 80 mol % and particularly preferably greater than 90 mol % of the aromatic or polyaromatic compounds contained in the hydrocarbon-based feedstock. The conversion is calculated by dividing the difference between the total moles of aromatic or polyaromatic compounds in the hydrocarbon feedstock and in the product by the total moles of aromatic or polyaromatic compounds in the hydrocarbon feedstock.

According to a particular variant of the process according to the invention, a process for hydrogenating the benzene of a hydrocarbon feedstock, such as the reformate obtained from a catalytic reforming unit, is performed. The benzene content in said hydrocarbon feedstock is generally between 0.1% and 40% by weight, preferably between 0.5% and 35% by weight and particularly preferably between 2% and 30% by weight, the weight percentage being based on the total weight of the hydrocarbon feedstock.

The sulfur or chlorine content of the feedstock is generally less than 10 ppm by weight of sulfur or chlorine, respectively, and preferably less than 2 ppm by weight.

The hydrogenation of the benzene contained in the hydrocarbon feedstock may be performed in the gas phase or in the liquid phase, preferably in the liquid phase.

When it is performed in the liquid phase, a solvent may be present, such as cyclohexane, heptane or octane. In general, the hydrogenation of benzene takes place at a temperature of between 30 and 250° C., preferably between 50 and 200° C. and more preferably between 80 and 180° C., at a pressure of between 0.1 and 10 MPa, preferably between 0.5 and 4 MPa, at a hydrogen/(benzene) mole ratio between 0.1 and 10 and at an hourly space velocity HSV of between 0.05 and 50 $h^{-1}$, preferably between 0.5 and 10 $h^{-1}$.

The benzene conversion is generally greater than 50 mol %, preferably greater than 80 mol %, more preferably greater than 90 mol % and particularly preferably greater than 98 mol %.

Characteristics of the Support

The support for the catalyst used in the context of the process for hydrogenating aromatic or polyaromatic compounds according to the invention comprises an amorphous mesoporous alumina with a connectivity (Z) of greater than 2.7, preferably between 2.7 and 10, preferably between 2.8 and 10, very preferably between 3 and 9, more preferably between 3 and 8 and even more preferably between 3 and 7. Preferably, the support for the catalyst consists of an alumina as described above.

The alumina used as support in the catalyst used according to the process for hydrogenating aromatic or polyaromatic compounds according to the invention is a mesoporous alumina of controlled mesoporosity having good thermal and chemical stability, and having a centered, uniform and controlled mesopore size distribution.

Said alumina has a specific surface area and a pore distribution that are calibrated and suited to its use in a process for hydrogenating aromatic or polyaromatic compounds according to the invention.

Preferably, the alumina present in said support is a transition alumina such as a gamma, delta, theta, chi, rho or eta alumina, alone or as a mixture. More preferably, the alumina is a gamma, delta or theta transition alumina, alone or as a mixture.

The following support characteristics correspond to the characteristics of the support used for the preparation of the catalyst before impregnation of the active phase.

The support used for the preparation of the catalyst has a total pore volume of greater than or equal to 0.42 mL/g, preferably between 0.45 and 2.1 mL/g and particularly preferably between 0.48 and 1.5 mL/g.

The support used for the preparation of the catalyst advantageously has a macropore volume of less than or equal to 20% of the total pore volume of the support, preferably less than or equal to 10% of the total pore volume of the support, more preferentially less than or equal to 5% of the total pore volume of the support and even more preferably less than or equal to 2% of the total pore volume of the support.

The mesopore volume of the support used for the preparation of the catalyst is greater than or equal to 0.40 mL/g, preferably between 0.45 and 1.5 mL/g and particularly preferably between 0.45 and 1.0 mL/g.

The median mesopore diameter (Dp at Vmeso/2 in nm) measured by mercury porosimetry of the support used for the preparation of the catalyst is between 8 and 25 nm, preferably between 9 and 23 nm and particularly preferably between 10 and 20 nm.

The support used for the preparation of the catalyst has a BET specific surface area of greater than or equal to 30 $m^2/g$, preferably greater than or equal to 50 $m^2/g$, more preferentially between 60 and 500 $m^2/g$, even more preferably between 100 and 400 $m^2/g$, even more preferentially between 70 and 400 $m^2/g$ and even more preferentially between 100 and 200 $m^2/g$.

Said alumina used as support in the catalyst used in the process according to the present invention advantageously has a specific pore distribution. Preferably, the mesoporous alumina is free of micropores. Preferably, said alumina has the following pore distribution, measured by mercury porosimetry:
- the volume percentage included in the pores between 2 and 6 nm in size, relative to the total pore volume, is between 1% and 25%;
- the volume percentage included in the pores greater than 6 nm and less than 15 nm in size represents between 40% and 65% of the total pore volume, preferably between 60% and 95% of the total pore volume;
- the volume percentage included in the pores between 15 and 50 nm in size represents 0 and 50% of the total pore volume, preferably between 0 and 30% of the total pore volume, more preferentially between 0 and 20% of the total pore volume and even more preferentially between 0 and 8% of the total pore volume; and the volume percentage included in the pores between 50 and 7000 nm in size, which corresponds to the macropore volume, represents 0 to 20% of the total pore volume, preferably 0 to 10% of the total pore volume, more preferentially 0 to 5% of the total pore volume and even more preferably 0 to 2% of the total pore volume.

It is understood that the sum of the volumes represented by the pores of the two, three or four different populations of alumina is equal to 100% of the total pore volume.

Characteristics of the Catalyst

The finished catalyst, i.e. with the active phase deposited on the support, has the textural properties hereinbelow.

The catalyst used in the context of the process for hydrogenating aromatic or polyaromatic compounds according to the invention has a total pore volume of greater than or equal to 0.42 mL/g, preferably greater than 0.45 mL/g, more preferentially between 0.48 and 1.0 mL/g.

The catalyst used in the context of the process for hydrogenating aromatic or polyaromatic compounds according to the invention advantageously has a macropore volume of less than or equal to 20% of the total pore volume of the catalyst, preferably less than or equal to 10% of the total pore volume of the catalyst, more preferentially less than or equal to 5% of the total pore volume of the catalyst and even more preferably less than or equal to 2% of the total pore volume of the catalyst.

The mesopore volume of the catalyst used in the context of the process for hydrogenating aromatic or polyaromatic compounds according to the invention is greater than or equal to 0.40 mL/g, preferably greater than or equal to 0.45 mL/g, more preferentially between 0.45 and 0.65 mL/g.

The median mesopore diameter (Dp at Vmeso/2 in nm) measured by mercury porosimetry of the catalyst used in the process for hydrogenating aromatic or polyaromatic compounds according to the invention is between 3 and 25 nm, preferably between 4 and 23 nm and particularly preferably between 6 and 20 nm.

The catalyst has a BET specific surface area of greater than or equal to 5 $m^2/g$, preferably greater than or equal to 10 $m^2/g$, more preferentially between 30 and 400 $m^2/g$, preferably between 55 and 350 $m^2/g$, even more preferentially between 70 and 400 $m^2/g$ and even more preferentially between 100 and 200 $m^2/g$.

Preferably, the catalyst has a low microporosity; very preferably, it does not have any microporosity.

The catalyst used in the process according to the present invention advantageously has a specific pore distribution. Preferably, the catalyst has the following pore distribution, measured by mercury porosimetry:

the volume percentage included in the pores between 2 and 6 nm in size, relative to the total pore volume, is between 1% and 25%;

the volume percentage included in the pores greater than 6 nm and less than 15 nm in size represents between 40% and 65% of the total pore volume, preferably between 60% and 95% of the total pore volume;

the volume percentage included in the pores between 15 and 50 nm in size represents between 0 and 50% of the total pore volume, preferably between 0 and 30% of the total pore volume, more preferentially between 0 and 20% of the total pore volume and even more preferentially between 0 and 8% of the total pore volume; and the volume percentage included in the pores between 50 and 7000 nm in size, which corresponds to the macropore volume, represents 0 to 20% of the total pore volume, preferably 0 to 10% of the total pore volume, more preferentially 0 to 5% of the total pore volume and even more preferably 0 to 2% of the total pore volume.

It is understood that the sum of the volumes represented by the pores of the two, three or four different populations of the catalyst is equal to 100% of the total pore volume.

As regards the active phase, the nickel content is between 5% and 65% by weight of said element relative to the total weight of the catalyst, preferably between 8% and 55% by weight, even more preferably between 8% and 40% by weight, particularly preferably between 10% and 35% by weight and even more preferably between 15% and 35% by weight. The Ni content is measured by X-ray fluorescence.

The size of the nickel particles in the catalyst is less than 20 nm, preferably between 1.5 and 18 nm. The term "size of the nickel particles" means the diameter of the nickel crystallites in oxide form. The diameter of the nickel crystallites in oxide form is determined by X-ray diffraction, from the width of the diffraction line located at the 2theta angle=43° (i.e. according to the crystallographic direction [200]) using the Scherrer relationship. This method, used in X-ray diffraction on polycrystalline samples or powders which connects the width at half-height of the diffraction peaks to the size of the particles, is described in detail in the reference: Appl. Cryst. (1978), 11, 102-113 "Scherrer after sixty years: A survey and some new results in the determination of crystallite size", J. I. Langford and A. J. C. Wilson.

The active phase of the catalyst does not comprise any group VIB metal. It notably does not comprise any molybdenum or tungsten.

Said catalyst is in the form of grains with a mean diameter of between 0.5 and 10 mm. The grains may have any form known to those skilled in the art, for example the form of beads (preferably having a diameter of between 1 and 8 mm), rods, lozenges or hollow cylinders. Preferably, the catalyst (and the support used for the preparation of the catalyst) are in the form of rods with a mean diameter of between 0.5 and 10 mm, preferably between 0.8 and 3.2 mm and very preferably between 1.0 and 2.5 mm, and a mean length of between 0.5 and 20 mm. The term "mean diameter" of the rods means the mean diameter of the circle circumscribed at the right section of these rods. The catalyst may advantageously be in the form of cylindrical, multilobal, trilobal, or quadrilobal rods. Preferably, the form will be trilobal or quadrilobal. The form of the lobes may be adjusted according to any method known in the prior art.

Process for Preparing the Catalyst

The catalyst used in the context of the process for hydrogenating aromatic or polyaromatic compounds according to the invention is prepared from a specific alumina gel. The particular pore distribution observed in the catalyst is notably due to the preparation process starting with the specific alumina gel.

The catalyst used in the context of the process according to the present invention is advantageously prepared according to the preparation process comprising at least the following steps:

a) at least one step of precipitation of alumina, in aqueous reaction medium, of at least one basic precursor chosen from sodium aluminate, potassium aluminate, ammonia, sodium hydroxide and potassium hydroxide and of at least one acidic precursor chosen from aluminum sulfate, aluminum chloride, aluminum nitrate, sulfuric acid, hydrochloric acid and nitric acid, in which at least one of the basic or acidic precursors comprises aluminum, the relative flow rate of the acidic and basic precursors is chosen so as to obtain a pH of the reaction medium of between 8.5 and 10.5 and the flow rate of the acidic and basic precursor(s) containing aluminum is adjusted so as to obtain a degree of progress of said first step of between 40% and 100%, the degree of progress being defined as being the proportion of alumina formed as $Al_2O_3$ equivalent during said first precipitation step relative to the total amount of alumina formed on conclusion of step c) of the preparation process, said first precipitation step taking place at a temperature of between 10 and 50° C. and for a time of between 2 minutes and 30 minutes, b) a step of heat treatment of the suspension heated to a temperature of between 50 and 200° C. for a time of between 30 minutes and 5 hours allowing the production of an alumina gel, c) a step of filtering the suspension obtained on conclusion of the heat treatment step b), followed by at least one step of washing the gel obtained, d) a step of drying the alumina gel obtained on conclusion of step c) to obtain a powder, e) a step of forming the powder obtained on conclusion of step d) to obtain the crude material, f) a step of heat treatment of the crude material obtained on conclusion of step e) at a temperature of between 500 and 1000° C., in the presence or absence of an air stream containing up to 60% by volume of water, to obtain a calcined aluminous porous oxide support, g) a step of impregnating said support with a solution comprising the salt(s) of the precursor(s) of the nickel-based active phase, h) a step of drying the impregnated support at a temperature below 250° C., so as to obtain a dried catalyst, i) optionally, a heat treatment of said dried catalyst at a temperature of between 250 and 1000° C. in the presence or absence of water.

In general, the term "degree of progress" of the $n^{th}$ precipitation step means the percentage of alumina formed as $Al_2O_3$ equivalent in said $n^{th}$ step, relative to the total amount of alumina formed on conclusion of all of the precipitation steps and more generally on conclusion of the steps for preparing the alumina gel.

In the case where the degree of progress of said precipitation step a) is 100%, said precipitation step a) generally makes it possible to obtain an alumina suspension with an $Al_2O_3$ concentration of between 20 and 100 g/L, preferably between 20 and 80 g/L, preferably between 20 and 50 g/L.

Precipitation Step a)

The mixing in the aqueous reaction medium of at least one basic precursor and of at least one acidic precursor requires either that at least the basic precursor or the acidic precursor comprises aluminum, or that both the basic and acidic precursors comprise aluminum.

The basic precursors comprising aluminum are sodium aluminate and potassium aluminate. The preferred basic precursor is sodium aluminate.

The acidic precursors comprising aluminum are aluminum sulfate, aluminum chloride and aluminum nitrate. The preferred acidic precursor is aluminum sulfate.

Preferably, the aqueous reaction medium is water.

Preferably, said step a) is performed with stirring.

Preferably, said step a) is performed in the absence of organic additive.

Whether or not they contain aluminum, the acidic and basic precursors are mixed, preferably in solution, in the aqueous reaction medium, in proportions such that the pH of the resulting suspension is between 8.5 and 10.5.

In accordance with the invention, it is the relative flow rate of the acidic and basic precursors, whether or not they contain aluminum, which is chosen so as to obtain a pH of the reaction medium of between 8.5 and 10.5.

In the preferred case in which the basic and acidic precursors are, respectively, sodium aluminate and aluminum sulfate, the mass ratio of said basic precursor to said acidic precursor is advantageously between 1.6 and 2.05.

For the other basic and acidic precursors, whether or not they contain aluminum, the base/acid mass ratios are established by a curve of neutralization of the base with the acid. Such a curve is readily obtained by a person skilled in the art.

Preferably, said precipitation step a) is performed at a pH of between 8.5 and 10 and very preferably between 8.7 and 9.9.

The acidic and basic precursors are also mixed in amounts allowing the production of a suspension containing the desired amount of alumina, as a function of the final alumina concentration to be reached. In particular, said step a) allows the production of from 40% to 100% by weight of alumina relative to the total amount of alumina formed on conclusion of the precipitation step(s) and more generally on conclusion of the steps for preparing the alumina gel and preferably on conclusion of step c) of the preparation process according to the invention.

In accordance with the invention, it is the flow rate of the acidic and basic precursor(s) containing aluminum which is adjusted so as to obtain a degree of progress of the first step of between 40% and 100%.

Preferably, the degree of progress of said precipitation step a) is between 40% and 99%, preferably between 45% and 90% and preferably between 50% to 85%. In the case in which the degree of progress obtained on conclusion of the precipitation step a) is less than 100%, a second precipitation step is necessary so as to increase the amount of alumina formed. In this case, the degree of progress is defined as being the proportion of alumina formed as $Al_2O_3$ equivalent during said precipitation step a) relative to the total amount of alumina formed on conclusion of the two precipitation steps of the preparation process according to the invention or more generally on conclusion of step c) of the alumina preparation process.

Thus, as a function of the alumina concentration targeted on conclusion of the precipitation step(s), preferably between 20 and 100 g/L, the amounts of aluminum that need to be provided by the acidic and/or basic precursors are calculated and the flow rate of the precursors is adjusted as a function of the concentration of said aluminum precursors added, of the amount of water added to the reaction medium and of the degree of progress required for the precipitation step(s).

The flow rates of the acidic and/or basic precursor(s) containing aluminum depend on the size of the reactor used and thus on the amount of water added to the reaction medium.

Preferably, said precipitation step a) is performed at a temperature of between 10 and 45° C., preferably between 15 and 45° C., more preferably between 20 and 45° C. and very preferably between 20 and 40° C.

It is important for said precipitation step a) to take place at low temperature. In the case where said preparation process according to the invention comprises two precipitation steps, precipitation step a) is advantageously performed at a temperature below the temperature of the second precipitation step.

Preferably, said precipitation step a) is performed for a time of between 5 and 20 minutes, and preferably from 5 to 15 minutes.

Heat Treatment Step b)

The process for preparing the catalyst used in the context of the hydrogenation process according to the invention comprises a step b) of heat treatment of the suspension obtained on conclusion of the precipitation step a), said heat treatment step being performed at a temperature of between 50 and 200° C. for a time of between 30 minutes and 5 hours, to obtain the alumina gel.

Preferably, said heat treatment step b) is a maturation step.

Preferably, said heat treatment step b) is performed at a temperature of between 65 and 150° C., preferably between 65 and 130° C., preferably between 70 and 110° C., very preferably between 70 and 95° C.

Preferably, said heat treatment step b) is performed for a time of between 40 minutes and 5 hours, preferably between 40 minutes and 3 hours and preferably between 45 minutes and 2 hours.

Second Precipitation Step a') (Optional)

According to a preferred embodiment, in the case where the degree of progress obtained on conclusion of the precipitation step a) is less than 100%, said preparation process preferably comprises a second precipitation step a') after the first precipitation step.

Said second precipitation step makes it possible to increase the proportion of alumina produced.

Said second precipitation step a') is advantageously performed between said first precipitation step a) and the heat treatment step b).

In the case where a second precipitation step is performed, a step of heating the suspension obtained on conclusion of the precipitation step a) is advantageously performed between the two precipitation steps a) and a').

Preferably, said step of heating the suspension obtained on conclusion of step a), performed between said step a) and the second precipitation step a'), is performed at a temperature of between 20 and 90° C., preferably between 45 and 80° C., preferably between 50 and 70° C.

Preferably, said heating step is performed for a time of between 7 and 45 minutes and preferably between 7 and 35 minutes.

Said heating step is advantageously performed according to all the heating methods known to a person skilled in the art.

According to said preferred embodiment, said preparation process comprises a second step of precipitation of the suspension obtained on conclusion of the heating step, said second step being performed by adding to said suspension at least one basic precursor chosen from sodium aluminate, potassium aluminate, ammonia, sodium hydroxide and potassium hydroxide and at least one acidic precursor chosen from aluminum sulfate, aluminum chloride, aluminum nitrate, sulfuric acid, hydrochloric acid and nitric acid, in which at least one of the basic or acidic precursors comprises aluminum, the relative flow rate of the acidic and basic precursors is chosen so as to obtain a pH of the reaction medium of between 8.5 and 10.5 and the flow rate of the acidic and basic precursor(s) containing aluminum is adjusted so as to obtain a degree of progress of the second step of between 0 and 60%, the degree of progress being defined as being the proportion of alumina formed as $Al_2O_3$ equivalent during said second precipitation step relative to the total amount of alumina formed on conclusion of the two precipitation steps, more generally on conclusion of the steps for preparing the alumina gel and preferably on conclusion of step c) of the preparation process according to the invention, said step being performed at a temperature of between 20 and 90° C., and for a time of between 2 minutes and 50 minutes.

As in the first precipitation step a), the addition to the heated suspension of at least one basic precursor and of at least one acidic precursor requires either that at least the basic precursor or the acidic precursor comprises aluminum, or that both the basic and acidic precursors comprise aluminum.

The basic precursors comprising aluminum are sodium aluminate and potassium aluminate. The preferred basic precursor is sodium aluminate.

The acidic precursors comprising aluminum are aluminum sulfate, aluminum chloride and aluminum nitrate. The preferred acidic precursor is aluminum sulfate.

Preferably, said second precipitation step is performed with stirring.

Preferably, said second step is performed in the absence of organic additive.

Whether or not they contain aluminum, the acidic and basic precursors are mixed, preferably in solution, in the aqueous reaction medium, in proportions such that the pH of the resulting suspension is between 8.5 and 10.5.

As in the precipitation step a), it is the relative flow rate of the acidic and basic precursors, whether or not they contain aluminum, which is chosen so as to obtain a pH of the reaction medium of between 8.5 and 10.5.

In the preferred case in which the basic and acidic precursors are, respectively, sodium aluminate and aluminum sulfate, the mass ratio of said basic precursor to said acidic precursor is advantageously between 1.6 and 2.05.

For the other basic and acidic precursors, whether or not they contain aluminum, the base/acid mass ratios are established by a curve of neutralization of the base with the acid. Such a curve is readily obtained by a person skilled in the art.

Preferably, said second precipitation step is performed at a pH of between 8.5 and 10 and preferably between 8.7 and 9.9.

The acidic and basic precursors are also mixed in amounts making it possible to obtain a suspension containing the desired amount of alumina, as a function of the final alumina concentration to be reached. In particular, said second precipitation step makes it possible to obtain from 0 to 60% by weight of alumina as $Al_2O_3$ equivalent relative to the total amount of alumina formed on conclusion of the two precipitation steps.

As in the precipitation step a), it is the flow rate of the acidic and basic precursor(s) containing aluminum which is adjusted so as to obtain a degree of progress of the second step of between 0 and 60%, the degree of progress being defined as being the proportion of alumina formed during said second precipitation step relative to the total amount of alumina formed on conclusion of the two precipitation steps of the preparation process.

Preferably, the degree of progress of said second precipitation step a') is between 10% and 55% and preferably between 15% and 55%, the degree of progress being defined as being the proportion of alumina formed during said second precipitation step relative to the total amount of alumina formed on conclusion of the two precipitation steps of the alumina preparation process.

Thus, as a function of the alumina concentration targeted on conclusion of the precipitation step(s), preferably between 20 and 100 g/L, the amounts of aluminum which need to be provided by the acidic and/or basic precursors are calculated and the flow rate of the precursors is adjusted as a function of the concentration of said aluminum precursors added, of the amount of water added to the reaction medium and of the degree of progress required for each of the precipitation steps.

As in the precipitation step a), the flow rates of the acidic and/or basic precursor(s) containing aluminum depend on the size of the reactor used and thus on the amount of water added to the reaction medium.

By way of example, if the process is performed in a 3 L reactor and if 1 L of alumina suspension with a final $Al_2O_3$ concentration of 50 g/L is targeted, the targeted degree of progress is 50% as $Al_2O_3$ equivalent for the first precipitation step. Thus, 50% of the total alumina must be provided during the precipitation step a). The alumina precursors are sodium aluminate at an $Al_2O_3$ concentration of 155 g/L and aluminum sulfate at an $Al_2O_3$ concentration of 102 g/L. The precipitation pH of the first step is set at 9.5 and the second at 9. The amount of water added to the reactor is 622 mL.

For the first precipitation step a) performed at 30° C. and for 8 minutes, the flow rate of aluminum sulfate must be 10.5 mL/min and the flow rate of sodium aluminate is 13.2 mL/min. The mass ratio of sodium aluminate to aluminum sulfate is thus 1.91.

For the second precipitation step, performed at 70° C. for 30 minutes, the flow rate of aluminum sulfate must be 2.9 mL/min and the flow rate of sodium aluminate is 3.5 mL/min. The mass ratio of sodium aluminate to aluminum sulfate is thus 1.84.

Preferably, the second precipitation step is performed at a temperature of between 20 and 90° C., preferably between 45 and 80° C. and very preferably between 50 and 70° C.

Preferably, the second precipitation step is performed for a time of between 5 and 45 minutes and preferably from 7 to 40 minutes.

The second precipitation step generally makes it possible to obtain an alumina suspension with an $Al_2O_3$ concentration of between 20 and 100 g/L, preferably between 20 and 80 g/L, preferably between 20 and 50 g/L.

In the case where said second precipitation step is performed, said preparation process also advantageously comprises a second step of heating the suspension obtained on conclusion of said second precipitation step to a temperature of between 50 and 95° C. and preferably between 60 and 90° C.

Preferably, said second heating step is performed for a time of between 7 and 45 minutes.

Said second heating step is advantageously performed according to all the heating methods known to those skilled in the art.

Said second heating step makes it possible to increase the temperature of the reaction medium before subjecting the suspension obtained to the heat treatment step b).

Filtration Step c)

The process for preparing the catalyst used in the context of the hydrogenation process according to the invention also comprises a step c) of filtering the suspension obtained on conclusion of the heat treatment step b), followed by at least one step of washing the gel obtained. Said filtration step is performed according to the methods known to those skilled in the art.

The filterability of the suspension obtained on conclusion of the precipitation step a) or of the two precipitation steps a) and a') is improved by the presence of said final step b) of heat treatment of the suspension obtained, said heat treatment step promoting the productivity of the preparation process and also extrapolation of the process to the industrial level.

Said filtration step is advantageously followed by at least one step of washing with water and preferably from one to three washing steps, with an amount of water equal to the amount of precipitate filtered.

The sequence of steps a), b) and c) and optionally of the second precipitation step a'), and of the second heating step, makes it possible to obtain a specific alumina gel with a dispersibility index of greater than 70%, a crystallite size of between 1 and 35 nm, and also a sulfur content of between 0.001% and 2% by weight and a sodium content of between 0.001% and 2% by weight, the weight percentages being expressed relative to the total weight of the alumina gel.

The alumina gel thus obtained, also referred to as boehmite, has a dispersibility index of between 70% and 100%, preferably between 80% and 100%, very preferably between 85% and 100% and even more preferably between 90% and 100%.

Preferably, the alumina gel thus obtained has a crystallite size of between 2 and 35 nm.

Preferably, the alumina gel thus obtained comprises a sulfur content of between 0.001% and 1% by weight, preferably between 0.001% and 0.40% by weight, very preferably between 0.003% and 0.33% by weight and more preferably between 0.005% and 0.25% by weight relative to the total weight of the alumina gel. The sulfur content is measured by X-ray fluorescence.

Preferably, the alumina gel thus obtained comprises a sodium content of between 0.001% and 1% by weight, preferably between 0.001% and 0.15% by weight, very preferably between 0.0015% and 0.10% by weight, and 0.002% and 0.040% by weight relative to the total weight of the alumina gel. The sodium content is measured by inductively coupled plasma (ICP) spectrometry.

In particular, the alumina gel or boehmite in powder form according to the invention is composed of crystallites, the size of which, obtained by the Scherrer formula in X-ray diffraction along the crystallographic directions [020] and [120] are, respectively, between 1 and 20 nm and between 1 and 35 nm.

Preferably, the alumina gel according to the invention has a crystallite size along the crystallographic direction [020] of between 1 to 15 nm and a crystallite size along the crystallographic direction [120] of between 1 and 35 nm.

The X-ray diffraction on the alumina gels or boehmites was performed using the conventional powder method by means of a diffractometer.

The Scherrer formula is a formula used in X-ray diffraction on polycrystalline samples or powders which connects width at mid-height of the diffraction peaks to the size of the crystallites. It is described in detail in the reference: Appl. Cryst. (1978). 11, 102-113 Scherrer after sixty years: A survey and some new results in the determination of crystallite size, J. I. Langford and A. J. C. Wilson.

The alumina gel thus prepared and having a high degree of dispersibility makes it possible to facilitate the step of forming said gel according to any method known to those skilled in the art and in particular by extrusion blending, by granulation and by the "oil drop" technique.

Drying Step d)

In accordance with the invention, the alumina gel obtained on conclusion of the filtration step c) is dried in a drying step d) to obtain a powder.

Said drying step is advantageously performed at a temperature of between 20 and 50° C. and for a time of between 1 day and 3 weeks or by atomization.

In the case where said drying step d) is performed at a temperature of between 20 and 50° C. and for a time of between 1 day and 3 weeks, said drying step d) may advantageously be performed in a closed ventilated oven; preferably, said drying step is performed at a temperature of between 25 and 40° C. and for a time of between 3 days and two weeks.

In the case where said drying step d) is performed by atomization, the cake obtained on conclusion of the heat treatment step, followed by a filtration step, is resuspended. Said suspension is then sprayed as fine droplets, in a vertical cylindrical chamber in contact with a stream of hot air in order to evaporate the water according to the principle well known to those skilled in the art. The powder obtained is entrained by the heat stream to a cyclone or a bag filter which separates the air from the powder. Preferably, in the case where said drying step d) is performed by atomization, the atomization is performed according to the procedure described in the publication Asep Bayu Dani Nandiyanto, Kikuo Okuyama, Advanced Powder Technology, 22, 1-19, 2011.

Forming Step e)

In accordance with the invention, the powder obtained on conclusion of the drying step d) is formed in a step e) to obtain a crude material.

The term "crude material" means the formed material which has not undergone any heat treatment steps.

Preferably, said forming step e) is performed according to any technique known to those skilled in the art, for example the methods of forming by extrusion, by pelletizing, by the oil drop method or by spinning-plate granulation.

Very preferably, said forming step e) is performed by extrusion. Use may be made of a piston extruder through a die having the desired diameter, typically between 0.5 and 10 mm. The rods generally have a mean diameter of between 0.5 and 10 mm, preferably 0.8 and 3.2 mm, very preferably between 1.0 and 2.5 mm, and a mean length of between 0.5 and 20 mm. The rods may advantageously be presented in the form of cylindrical, multilobal, trilobal or quadrilobal rods. Preferably, the form will be trilobal or quadrilobal.

Any other element, for example silica in the form of a solution or an emulsion of silicic precursor, may be introduced during the forming.

Heat Treatment Step f)

In accordance with the invention, the crude material obtained on conclusion of the forming step e) then undergoes a step f) of heat treatment at a temperature of between 500 and 1000° C., in the presence or absence of a stream of air containing up to 60% by volume of water.

Preferably, said heat treatment step f) is performed at a temperature of between 500 and 850° C. Preferably, said heat treatment step g) is performed for a time of between 2 and 10 hours. The heat treatment step may be preceded by drying at a temperature of between 50° C. and 200° C., according to any technique known to those skilled in the art.

The term "heat treatment" means treatment at elevated temperature in absence or presence, respectively, of water. In the latter case, the contact with water vapor may take place at atmospheric pressure or at the autogenous pressure. Several combined cycles in the absence or in the presence of water may be performed.

In the event of the presence of water, the water content is preferably between 150 and 900 grams per kilogram of dry air, even more preferably between 250 and 650 grams per kilogram of dry air.

Said heat treatment step f) allows the transition of the alumina gel, also referred to as boehmite, toward a calcined alumina. The alumina has a crystallographic structure of the gamma, delta, theta, chi, rho or eta transition alumina type, alone or as a mixture. More preferably, the alumina is a gamma, delta or theta transition alumina, alone or as a mixture. The existence of the various crystallographic structures is associated with the conditions under which the heat treatment step f) is performed.

The process for preparing the alumina used as support for the catalyst used in the hydrogenation process according to the invention makes it possible to obtain an amorphous mesoporous alumina with a connectivity of greater than 2.7 and a controlled mesoporosity, said alumina having good thermal and chemical stability, having a centered, uniform and controlled mesopore size distribution, and a specific surface area and a calibrated pore volume and in particular calibrated mesopore volume and having the specific pore distribution as described above.

Step g) of Impregnation of the Active Phase

The deposition of nickel onto said support, in accordance with the implementation of step g), may be performed by dry impregnation or impregnation in excess, or alternatively by deposition-precipitation, according to methods that are well known to those skilled in the art.

Said step g) is preferentially performed by impregnation of the support consisting, for example, in placing said support in contact with at least one aqueous or organic solution (for example methanol or ethanol or phenol or acetone or toluene or dimethyl sulfoxide (DMSO)) or else consisting of a mixture of water and of at least one organic solvent, containing at least one nickel precursor at least partially in dissolved form, or alternatively placing said support in contact with at least one colloidal solution of at least one nickel precursor, in oxidized form (nickel oxide, oxy(hydroxide) or hydroxide nanoparticles) or in reduced form (metallic nanoparticles of nickel in the reduced state). Preferably, the solution is aqueous. The pH of this solution may be modified by optionally adding an acid or a base. According to another preferred variant, the aqueous solution may contain ammonia or ammonium ions $NH_4^+$.

Preferably, said step g) is performed by dry impregnation, which consists in placing the support for the catalyst in contact with a solution, containing at least one nickel precursor, the volume of the solution of which is between 0.25 and 1.5 times the pore volume of the support to be impregnated.

When the nickel precursor is introduced as an aqueous solution, a nickel precursor in the form of nitrate, carbonate, acetate, chloride, hydroxide, hydroxycarbonate, oxalate, sulfate, formate, complexes formed with a polyacid or an acid-alcohol and salts thereof, complexes formed with acetylacetonates, tetramine or hexamine complexes, or alternatively any other inorganic derivative that is soluble in aqueous solution, which is placed in contact with said calcined aluminous porous oxide, is advantageously used.

Preferably, the nickel precursor that is advantageously used is nickel nitrate, nickel chloride, nickel acetate or nickel hydroxycarbonate. Very preferably, the nickel precursor is nickel nitrate or nickel hydroxycarbonate.

According to another preferred variant, said nickel precursor is introduced as an ammoniacal solution by introducing a nickel salt, for example nickel hydroxide or nickel carbonate, into an ammoniacal solution or into an ammonium carbonate or ammonium hydrogen carbonate solution.

The amounts of the nickel precursor(s) introduced into the solution are chosen so that the total nickel content is between 5% and 65% by weight, preferably between 8% and 55% by weight, preferably between 8% and 40% by weight, particularly preferably between 10% and 35% by weight and even more preferably between 15% and 35% by weight of said element relative to the total weight of the catalyst.

Step h) of Drying of the Impregnated Support

Step h) of drying of the impregnated support obtained on conclusion of step g) is performed at a temperature below 250° C., preferably between 15 and 240° C., more preferentially between 30 and 220° C., even more preferentially between 50 and 200° C. and even more preferentially between 70 and 180° C., for a time typically between 10 minutes and 24 hours. Longer times are not excluded, but do not necessarily afford any improvement.

The drying step may be performed via any technique known to those skilled in the art. It is advantageously performed under an inert atmosphere or under an atmosphere containing oxygen or under a mixture of inert gas and oxygen. It is advantageously performed at atmospheric pressure or at reduced pressure. Preferably, this step is performed at atmospheric pressure and in the presence of air or nitrogen.

Step i) of Heat Treatment of the Dried Catalyst (Optional)

The catalyst thus dried may then undergo an additional heat treatment step i) at a temperature of between 250 and 1000° C. and preferably between 250 and 750° C., for a time typically between 15 minutes and 10 hours, under an inert atmosphere or under an atmosphere containing oxygen, in the presence or absence of water. Longer treatment times are not excluded, but do not necessarily afford any improvement.

The term "heat treatment" means treatment at elevated temperature in the absence or presence, respectively, of water. In the latter case, the contact with water vapor may take place at atmospheric pressure or at the autogenous pressure. Several combined cycles with or without the presence of water may be performed. After this or these treatments, the catalyst precursor comprises nickel in oxide form, i.e. in the form NiO.

In the case of the presence of water, the water content is preferably between 150 and 900 grams per kilogram of dry air, and even more preferably between 250 and 650 grams per kilogram of dry air.

Step j) of Reduction with a Reducing Gas (Optional)

Prior to the use of the catalyst in the catalytic reactor and the implementation of a hydrogenation process, at least one reducing treatment step j) in the presence of a reducing gas is advantageously performed after step h) or i) so as to obtain a catalyst comprising nickel at least partially in metallic form.

This treatment makes it possible to activate said catalyst and to form metal particles, in particular nickel in the valent state zero. Said reducing treatment may be performed in situ or ex situ, i.e. after or before loading the catalyst into the hydrogenation reactor.

The reducing gas is preferably hydrogen. The hydrogen may be used pure or as a mixture (for example a hydrogen/nitrogen, hydrogen/argon or hydrogen/methane mixture). In the case where hydrogen is used as a mixture, all proportions are envisageable.

Said reducing treatment is performed at a temperature of between 120 and 500° C., preferably between 150 and 450° C. When the catalyst does not undergo passivation, or undergoes a reducing treatment before passivation, the reducing treatment is performed at a temperature of between 180 and 500° C., preferably between 200 and 450° C., and even more preferentially between 350 and 450° C. When the catalyst has undergone a prior passivation, the reducing treatment is generally performed at a temperature of between 120 and 350° C., preferably between 150 and 350° C.

The duration of the reducing treatment is generally between 2 and 40 hours, preferably between 3 and 30 hours. The temperature increase up to the desired reduction temperature is generally slow, for example set at between 0.1 and 10° C./min, preferably between 0.3 and 7° C./min.

The hydrogen flow rate, expressed in L/hour/gram of catalyst, is between 0.01 and 100 L/hour/gram of catalyst, preferably between 0.05 and 10 L/hour/gram of catalyst, and even more preferably between 0.1 and 5 L/hour/gram of catalyst.

Passivation Step k) (Optional)

Prior to its use in the catalytic reactor, the catalyst according to the invention may optionally undergo a step of passivation (step k) with a sulfur-based or oxygen-based compound or with $CO_2$ before or after the reducing treatment j). This passivation step may be performed ex situ or in situ. The passivation step is performed by implementing methods known to those skilled in the art.

The step of passivation with sulfur makes it possible to improve the selectivity of the catalysts and to avoid runaway reactions during start-up with fresh catalysts. Passivation generally consists in irreversibly poisoning with the sulfur compound the most virulent active sites of nickel which exist on the fresh catalyst and thus in attenuating the activity of the catalyst in favor of its selectivity. The passivation step is performed by implementing methods known to those skilled in the art and notably, by way of example, by implementing one of the methods described in patents EP0466567, U.S. Pat. No. 5,153,163, FR2676184, WO2004/098774 and EP0707890. The sulfur compound is chosen, for example, from the following compounds: thiophene, thiophane, alkyl monosulfides such as dimethyl sulfide, diethyl sulfide, dipropyl sulfide and propyl methyl sulfide, or alternatively an organic disulfide of formula HO—$R_1$—S—S—$R_2$—OH such as dithiodiethanol of formula HO—$C_2H_4$—S—S—$C_2H_4$—OH (often referred to as DEODS). The sulfur content is generally between 0.1% and 2% by weight of said element relative to the mass of the catalyst.

The step of passivation with an oxygen-based compound or with $CO_2$ is generally performed after a prior reducing treatment at high temperature, generally between 350 and 500° C., and makes it possible to preserve the metal phase of the catalyst in the presence of air. A second reducing treatment at a lower temperature generally between 120 and 350° C. is then generally performed. The oxygen-based compound is generally air or any other stream containing oxygen.

The invention is illustrated by the examples that follow.

EXAMPLES

Example 1: Preparation of an Alumina Support AL-1

In a first step, the synthesis of an alumina support AL-1 is performed in a 7 L reactor and a final 5 L suspension is prepared in 3 steps, two precipitation steps followed by a maturation step.

The final targeted concentration of alumina is 45 g/L. The amount of water added to the reactor is 3267 mL. The stirring is at 350 rpm throughout the synthesis.

A first step of coprecipitation in water of aluminum sulfate $Al_2(SO_4)$ and of sodium aluminate NaAlOO is performed at 30° C. and at pH=9.5 for a time of 8 minutes. The concentrations of the aluminum precursors used are as follows: $Al_2(SO_4)$ at 102 g/L of $Al_2O_3$ and NaAlOO at 155 g/L of $Al_2O_3$.

An aluminum sulfate $Al_2(SO_4)$ solution is added continuously for 8 minutes at a flow rate of 69.6 mL/min to a solution of sodium aluminate NaAlOO at a flow rate of 84.5 mL/min in a base/acid mass ratio=1.84 so as to adjust the pH to a value of 9.5. The temperature of the reaction medium is maintained at 30° C.

A suspension containing an alumina precipitate is obtained.

Since the targeted final alumina concentration is 45 g/L, the flow rate of the aluminum sulfate $Al_2(SO_4)$ and sodium aluminate NaAlOO precursors introduced into the first precipitation step are, respectively, 69.6 mL/min and 84.5 mL/min.

These flow rates of acidic and basic precursors containing aluminum make it possible to obtain on conclusion of the first precipitation step a degree of progress of 72%.

The suspension obtained is then subjected to a temperature rise from 30 to 65° C. over 15 minutes.

A second step of coprecipitation of the suspension obtained is then performed by adding aluminum sulfate $Al_2(SO_4)$ at a concentration of 102 g/L of $Al_2O_3$ and sodium aluminate NaAlOO at a concentration of 155 g/L of $Al_2O_3$. A solution of aluminum sulfate $Al_2(SO_4)$ is thus added continuously to the heated suspension obtained on conclusion of the first precipitation step for 30 minutes at a flow rate of 7.2 mL/min to a solution of sodium aluminate NaAlOO in a base/acid mass ratio=1.86 so as to adjust the pH to a value of 9. The temperature of the reaction medium in the second step is maintained at 65° C.

A suspension containing an alumina precipitate is obtained.

Since the targeted final alumina concentration is 45 g/L, the flow rate of the aluminum sulfate $Al_2(SO_4)$ and sodium aluminate NaAlOO precursors introduced into the second precipitation step are, respectively, 7.2 mL/min and 8.8 mL/min.

These flow rates of acidic and basic precursors containing aluminum make it possible to obtain on conclusion of the second precipitation step a degree of progress of 28%.

The suspension obtained is then subjected to a temperature rise from 65 to 90° C.

The suspension then undergoes a heat treatment step in which it is maintained at 90° C. for 60 minutes.

The suspension obtained is then filtered by water displacement on a Buchner sinter tool and the alumina gel obtained is washed 3 times with 5 L of distilled water.

The characteristics of the alumina gel thus obtained are summarized in table 1 below.

TABLE 1

Characteristics of the alumina gel for the preparation of the support AL-1

| | |
|---|---|
| Dispersibility index (%) | 100 |
| Size [020] (nm) | 2.8 |
| Size [120] (nm) | 3.5 |
| Sodium Na (weight %) | 0.074 |
| Sulfur S (weight %) | 0.0364 |

A gel with a dispersibility index of 100% is thus obtained.

The alumina gel obtained according to example 1 is then dried by atomization with an inlet temperature of 250° C. and an outlet temperature of 130° C.

The dried alumina gel is then introduced into a Brabender blender. Water acidified with nitric acid to a total acid content of 3%, expressed by weight relative to the mass of dried gel introduced into the blender, is added over 5 minutes, while blending at 20 rpm. The acidic blending is continued for 15 minutes. A neutralization step is then performed by adding an ammoniacal solution into the blender, to a degree of neutralization of 50%, expressed as weight of ammonia relative to the amount of nitric acid introduced into the blender for the acidification step. Blending is continued for 3 minutes.

The paste obtained is then extruded through a trilobal 2 mm die. The rods obtained are dried at 100° C. for 16 hours and then calcined for 2 hours at 800° C. under a stream of wet air containing 30% by volume of water.

The characteristics of the alumina AL-1 formed are collated in table 4 below.

Example 2: Preparation of an Alumina Support AL-2

In a first stage, the synthesis of a non-compliant alumina gel prepared according to the preparation process described in patent U.S. Pat. No. 7,790,562 is performed. In particular, the process for preparing the alumina gel does not comprise a step of heat treatment of the suspension obtained on conclusion of the precipitation steps and the first precipitation step a) does not produce an amount of alumina of greater than 40% relative to the total amount of alumina formed on conclusion of the second precipitation step. The synthesis is performed in a 7 L reactor and a final 5 L suspension is obtained in 2 precipitation steps. The amount of water added to the reactor is 3868 mL. The targeted final alumina concentration is 30 g/L.

A first step of coprecipitation of aluminum sulfate $Al_2(SO_4)$ and of sodium aluminate NaAlOO is performed at 30° C. and pH=9.3 for a time of 8 minutes. The concentrations of the aluminum precursors used are as follows: $Al_2(SO_4)$ at 102 g/L of $Al_2O_3$ and NaAlOO at 155 g/L of $Al_2O_3$. The stirring is at 350 rpm throughout the synthesis.

A solution of aluminum sulfate $Al_2(SO_4)$ is added continuously over 8 minutes at a flow rate of 19.6 mL/min to a solution of sodium aluminate NaAlOO in a base/acid mass ratio=1.80 so as to adjust the pH to a value of 9.3. The temperature of the reaction medium is maintained at 30° C.

A suspension containing an alumina precipitate is obtained.

Since the targeted final alumina concentration is 30 g/L, the flow rate of the aluminum sulfate $Al_2(SO_4)$ and sodium aluminate NaAlOO precursors introduced into the first precipitation step are, respectively, 19.6 mL/min and 23.3 mL/min.

These flow rates of acidic and basic precursors containing aluminum make it possible to obtain, on conclusion of the first precipitation step, a degree of progress of 30%.

The suspension obtained is then subjected to a temperature rise from 30 to 57° C.

A second step of coprecipitation of the suspension obtained is then performed by addition of aluminum sulfate $Al_2(SO_4)$ at a concentration of 102 g/L of $Al_2O_3$ and of sodium aluminate NaAlOO at a concentration of 155 g/L of $Al_2O_3$. A solution of aluminum sulfate $Al_2(SO_4)$ is thus added continuously to the heated suspension obtained on conclusion of the first precipitation step for 30 minutes at a flow rate of 12.8 mL/min to a solution of sodium aluminate NaAlOO in a base/acid mass ratio=1.68 so as to adjust the pH to a value of 8.7. The temperature of the reaction medium in the second step is maintained at 57° C.

A suspension containing an alumina precipitate is obtained.

Since the targeted final alumina concentration is 30 g/L, the flow rate of the aluminum sulfate $Al_2(SO_4)$ and sodium aluminate NaAlOO precursors containing aluminum introduced into the second precipitation step are, respectively, 12.8 mL/min and 14.1 mL/min.

These flow rates of acidic and basic precursors containing aluminum make it possible to obtain, on conclusion of the second precipitation step, a degree of progress of 70%.

The suspension thus obtained does not undergo a maturation step.

The suspension obtained is then filtered by water displacement on a Buchner sinter tool and the alumina gel obtained is washed 3 times with 5 L of distilled water at 70° C.

The characteristics of the alumina gel thus obtained are summarized in table 2 below.

TABLE 2

| Characteristics of the alumina gel for the preparation of the support AL-2 | |
|---|---|
| Dispersibility index (%) | 60 |
| Size [020] (nm) | 2.9 |
| Size [120] (nm) | 4.1 |
| Sodium Na (weight %) | 0.011 |
| Sulfur S (weight %) | 0.057 |

The dried alumina gel is then introduced into a Brabender blender. Water acidified with nitric acid to a total acid content of 3%, expressed by weight relative to the mass of dried gel introduced into the blender, is added over 5 minutes, during blending at 20 rpm. The acidic blending is continued for 15 minutes. A neutralization step is then performed by addition of an ammoniacal solution to the blender, to a degree of neutralization of 50%, expressed as weight of ammonia relative to the amount of nitric acid introduced into the blender for the acidification step. Blending is continued for 3 minutes.

The paste obtained is then extruded through a trilobal 2 mm die. The rods obtained are dried at 100° C. for 16 hours and then calcined for 2 hours at 800° C. under a stream of wet air containing 30% by volume of water.

The characteristics of the alumina AL-2 formed are reported in table 4 below.

Example 3: Preparation of an Alumina Support AL-3

A commercial boehmite Pural SB3® is used in powder form. Its characteristics are summarized in table 3 below.

TABLE 3

| Characteristics of Pural SB3 ® | |
|---|---|
| Dispersibility index (%) | 98 |
| Size [020] (nm) | 3.1 |
| Size [120] (nm) | 4.7 |
| Sodium Na (weight ppm) | <detection limit |
| Sulfur S (weight ppm) | <detection limit |

The sulfur content measured by the X-ray fluorescence method and the sodium content measured by inductively coupled plasma (ICP) spectrometry are below the detection limit for these measuring methods.

The forming thereof is performed in the first step by acidic blending, with an aqueous acid solution (Ta: content of nitric acid of 3% by weight/dry mass introduced into the blender) for 0 to 60 minutes. This is followed by basic blending with a degree of neutralization (Tb: 50% by weight/$HNO_3$). The paste obtained is extruded through a trilobal 2 mm die. The rods obtained are dried at 100° C. for 16 hours and then calcined for 2 hours at 800° C. under a stream of wet air containing 30% by volume of water.

The characteristics of the alumina AL-3 formed are reported in table 4 below.

Example 4: Preparation of a Catalyst A (in Accordance with the Process According to the Invention)

Catalyst A is prepared by dry impregnation of an aqueous solution S1 of Ni nitrate onto the alumina AL-1. A content of 20% by weight of nickel relative to the total weight of the catalyst is targeted.

Solution S1 is prepared by dissolving 35.5 g of nickel nitrate ($NiNO_3$, supplied by Strem Chemicals®) in a volume of 10 mL of distilled water. Its NiO concentration is 20.1% by mass (relative to the mass of the solution).

Dry impregnation of the alumina AL-1 is performed by adding dropwise a volume of 8.7 mL of solution S1 to a mass of 10 g of alumina AL-1, over a time of 10 minutes. The catalytic precursor thus obtained is then oven-dried at 120° C. for 16 hours. The dried catalyst is then calcined under a stream of air of 1 L/h/g of catalyst, at 450° C. for 2 hours (temperature increase ramp of 5° C./min). The calcined catalyst A is then obtained.

The characteristics of the calcined catalyst A thus obtained are reported in table 4 below.

Example 5: Preparation of Catalyst B Having a Different Porosity (not in Accordance with the Process According to the Invention)

Catalyst B is prepared by dry impregnation of an aqueous solution S2 of Ni nitrate onto the alumina AL-2. A content of 20% by weight of nickel relative to the total weight of the catalyst is targeted.

Solution S2 is prepared by dissolving 41.5 g of nickel nitrate ($NiNO_3$, supplied by Strem Chemicals®) in a volume of 10 mL of distilled water. Its NiO concentration is 20.7% by mass (relative to the mass of the solution).

Dry impregnation of the alumina AL-2 is performed by adding dropwise a volume of 8.0 mL of solution S2 to a mass of 10 g of alumina AL-2, for a time of 10 minutes. The catalytic precursor thus obtained is then oven-dried at 120° C. for 16 hours. The dried catalyst is then calcined under a stream of air of 1 L/h/g of catalyst, at 450° C. for 2 hours (temperature increase ramp of 5° C./min). The calcined catalyst B is then obtained.

The characteristics of the calcined catalyst B thus obtained are reported in table 4 below.

Example 6: Preparation of Catalyst C Having a Different Porosity (not in Accordance with the Process According to the Invention)

Catalyst C is prepared by dry impregnation of an aqueous solution S3 of Ni nitrate onto the alumina AL-3. A content of 20% by weight of nickel relative to the total weight of the catalyst is targeted.

Solution S3 is prepared by dissolving 48.0 g of nickel nitrate ($NiNO_3$, supplied by Strem Chemicals®) into a volume of 10 mL of distilled water. Its NiO concentration is 21.3% by mass (relative to the mass of the solution).

Dry impregnation of the alumina AL-3 is performed by adding dropwise a volume of 7.0 mL of solution S3 to a mass of 10 g of alumina AL-3, over a time of 10 minutes. The catalytic precursor thus obtained is then oven-dried at 120° C. for 16 hours. The dried catalyst is then calcined under a stream of air of 1 L/h/g of catalyst, at 450° C. for 2 hours (temperature increase ramp of 5° C./min). The calcined catalyst C is then obtained.

The characteristics of the calcined catalyst C thus obtained are reported in table 4 below.

TABLE 4

Properties of the aluminas AL-1, AL-2 and AL-3 and of the catalysts A, B and C

| | ALUMINAS | | |
|---|---|---|---|
| | AL-1 | AL-2 | AL-3 |
| BET surface area (m²/g) | 135 | 145 | 100 |
| Total pore volume (mL/g) | 0.87 | 0.80 | 0.70 |
| Mesopore volume (mL/g) | 0.85 (98%)* | 0.76 (95%)* | 0.69 (99%)* |
| Median mesopore diameter (nm) | 15 | 14 | 12 |
| Macropore volume (mL/g) | 0.02 (2%)* | 0.04 (5%)* | 0.01 (1%)* |
| Connectivity (Z) | 6 | 2 | 2.3 |

| | CATALYSTS | | |
|---|---|---|---|
| | A | B | C |
| Ni (weight %) | 20.1 | 20.0 | 20.2 |
| BET surface area (m²/g) | 99 | 106 | 72 |
| Total pore volume (mL/g) | 0.61 | 0.564 | 0.487 |
| Mesopore volume (mL/g) | 0.595 (98%)* | 0.534 (95%)* | 0.48 (99%)* |
| Median mesopore diameter (nm) | 13.8 | 12.7 | 10.0 |
| Macropore volume (mL/g) | 0.015 (2%)* | 0.03 (5%)* | 0.007 (1%)* |
| Size of the NiO crystallites (nm) | 12.5 | 12.0 | 14.3 |

*expressed as a percentage of the total pore volume

Example 7: Evaluation of the Catalytic Properties of Catalysts A, B and C in the Hydrogenation of Toluene Catalysts A, B and C described in the above examples are tested with respect to the toluene hydrogenation reaction.

The toluene hydrogenation reaction is performed in a 500 mL stainless-steel autoclave, which is equipped with a magnetically driven mechanical stirrer and can function at a maximum pressure of 100 bar (10 MPa) and temperatures of between 5° C. and 200° C.

Prior to its introduction into the autoclave, an amount of 2 mL of catalyst is reduced ex situ under a stream of hydrogen of 1 L/h/g of catalyst, at 400° C. for 16 hours (temperature increase ramp of 1° C./min) and is then transferred into the autoclave, protected from air. After addition of 216 mL of n-heptane (supplier: VWR®, purity >99% HPLC chromanorm), the autoclave is closed, purged and then pressurized to 35 bar (3.5 MPa) of hydrogen, and brought to the test temperature equal to 80° C. At time t=0, about 26 g of toluene (supplier: SDS®, purity>99.8%) are introduced into the autoclave (the initial composition of the reaction mixture is then toluene 6 weight %/n-heptane 94 weight %) and stirring is started at 1600 rpm. The pressure is kept constant at 35 bar (3.5 MPa) in the autoclave by means of a reservoir bottle located upstream of the reactor.

The reaction progress is monitored by taking samples of the reaction medium at regular time intervals: the toluene is totally hydrogenated to methylcyclohexane. The hydrogen consumption is also monitored over time by reducing the pressure in a reservoir bottle located upstream of the reactor. The catalytic activity is expressed in moles of $H_2$ consumed per minute and per gram of Ni.

The catalytic activities measured for the catalysts A, B and C are reported in table 5 below. They are given relative to the catalytic activity measured for the catalyst A ($A_{HYDA}$).

TABLE 5

Comparison of the hydrogenation performance in the hydrogenation of toluene ($A_{HYDA}$)

| Catalyst | Compliant? | $A_{HYDA}$ (%) |
|---|---|---|
| A | Yes | 100 |
| B | No | 79 |
| C | No | 51 |

This clearly shows the improved performance of catalyst A prepared according to the invention and in particular the impact of its specific porosity and notably the connectivity of its pores. Specifically, catalyst B, although having NiO crystallites slightly smaller in size than those of catalyst A, has poorer catalytic performance. In the case of catalyst C, its low connectivity and its low specific surface area lead to a larger NiO crystallite size and thus to catalytic performance inferior to that of catalyst A.

The invention claimed is:

1. A process comprising hydrogenating at least one aromatic or polyaromatic compound contained in a hydrocarbon feedstock having a final boiling point of less than or equal to 650° C., said process being performed in the gas phase or in the liquid phase, at a temperature of between 30 and 350° C., at a pressure of between 0.1 and 20 MPa, at a hydrogen/(aromatic or polyaromatic compound) mole ratio of 0.1 to 10 and at an hourly space velocity HSV of 0.05 to 50 h$^{-1}$, in the presence of a catalyst comprising an active phase comprising nickel, said active phase not comprising any group VIB metal, and a support comprising an amorphous mesoporous alumina having a connectivity (Z) of greater than 2.7, the connectivity being determined from nitrogen absorption/desorption isotherms, and a mesopore volume of greater than or equal to 0.40 mL/g.

2. The process as claimed in claim 1, in which the nickel content of said catalyst is 5% to 65% by weight relative to the total weight of the catalyst.

3. The process as claimed in claim 1, in which said alumina support has a connectivity (Z) of 2.7 to 10.

4. The process as claimed in claim 1, in which the support has mesopores with a median mesopore diameter of 8 to 25 nm.

5. The process as claimed in claim 1, in which the support has the following pore distribution:
   the volume percentage included in the pores of 2 to 6 nm in size is 1% to 25% of the total pore volume;
   the volume percentage included in the pores greater than 6 nm and less than 15 nm in size represents 40% to 95% of the total pore volume;
   the volume percentage included in the pores 15 to 50 nm in size represents 0 to 50% of the total pore volume; and
   the volume percentage included in the pores 50 to 7000 nm in size, which corresponds to the macropore volume, represents 0 to 20% of the total pore volume.

6. The process as claimed in claim 1, in which the support does not contain any micropores.

7. The process as claimed in claim 1, in which the active phase comprising nickel comprises nickel particles having a size of less than 20 nm.

8. The process as claimed in claim 1, in which said catalyst is prepared by at least the following:
   a) obtaining a suspension by at least one precipitation of alumina, in aqueous reaction medium, from at least one basic precursor that is sodium aluminate, potassium aluminate, ammonia, sodium hydroxide or potassium hydroxide and from at least one acidic precursor that is aluminum sulfate, aluminum chloride, aluminum nitrate, sulfuric acid, hydrochloric acid or nitric acid, in which at least one of the basic or acidic precursors comprises aluminum, the relative flow rate of the acidic and basic precursors is chosen so as to obtain a pH of the reaction medium of 8.5 to 10.5 and the flow rate of the acidic and basic precursor(s) containing aluminum is adjusted so as to obtain a rate of progress of said first step of 40% to 100%, the rate of progress being defined as being the proportion of alumina formed as $Al_2O_3$ equivalent during said first precipitation step relative to the total amount of alumina formed on conclusion of c) of the preparation process, said first precipitation taking place at a temperature of 10 to 50° C., and for a time of 2 minutes to 30 minutes,
   b) heat treatment of the suspension formed in a) heated to a temperature of 50 to 200° C. for a time of between 30 minutes and 5 hours allowing the production of an alumina gel,
   c) filtering the gel obtained on conclusion of the heat treatment b), followed by at least one washing the gel obtained,
   d) drying the alumina gel obtained on conclusion of c) to obtain a powder,
   e) forming the powder obtained on conclusion of d) to obtain a crude material,
   f) heat treatment of the crude material obtained on conclusion of e) at a temperature of 500 to 1000° C., in the presence or absence of an air stream containing up to 60% by volume of water, to obtain a calcined aluminous porous oxide support,
   g) impregnating said support obtained on conclusion of f) with a solution comprising salt(s) of precursor(s) of the active phase comprising nickel,
   h) a step of drying the impregnated support at a temperature below 250° C., so as to obtain a dried catalyst.

9. The process as claimed in claim 8, in which, in the case where the degree of progress obtained on conclusion of the first precipitation a) is less than 100%, said preparation process comprises a second precipitation a') after the first precipitation a).

10. The process as claimed in claim 9, in which the sulfur content of the alumina gel obtained on conclusion of step b) is 0.001% to 2% by weight relative to the total weight of the alumina gel, and the sodium content of said alumina gel is 0.001% to 2% by weight relative to the total weight of said alumina gel.

11. The process as claimed in claim 9, in which at least one heat treatment i) of the dried catalyst obtained on conclusion of h) is performed at a temperature of 250 to 1000° C., in the presence or absence of water.

12. The process as claimed in claim 11, in which at least one reductive treatment j) is performed in the presence of a reducing gas after h) or i) so as to obtain a catalyst comprising nickel at least partially in metallic form.

13. The process as claimed in claim 1, comprising hydrogenation of benzene as the aromatic compound, at a temperature of 30 to 250° C., at a pressure of 0.1 to 10 MPa, at a hydrogen/(benzene) mole ratio of 0.1 to 10 and at an hourly space velocity HSV of 0.05 to 50 $h^{-1}$.

14. The process as claimed in claim 1, wherein said hydrocarbon feedstock is a reformate obtained from catalytic reforming.

* * * * *